June 2, 1959         J. R. WEST         2,889,082
GRANULAR MATERIAL DISPENSING APPARATUS
Filed May 8, 1956         3 Sheets-Sheet 1
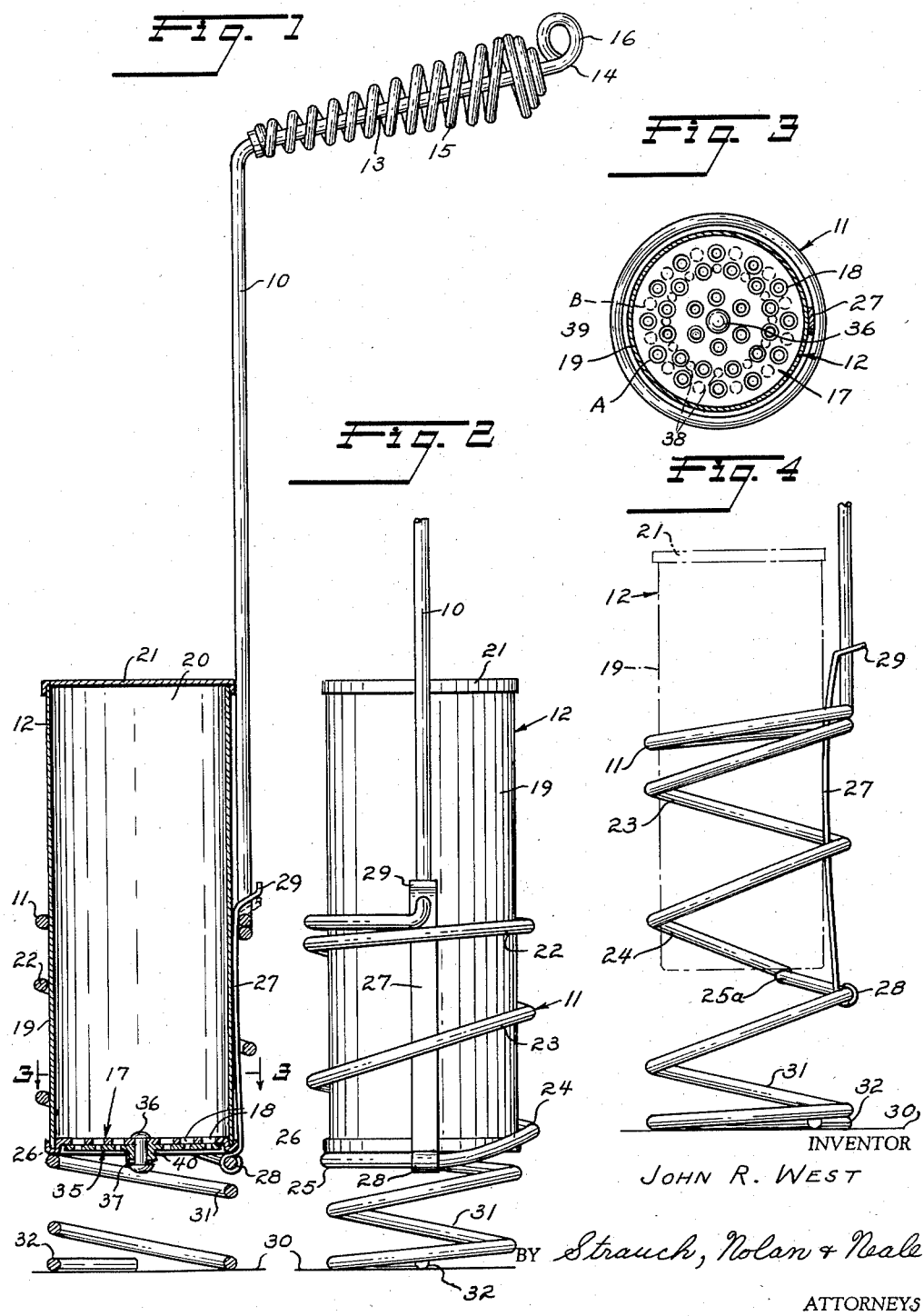
INVENTOR
JOHN R. WEST
BY Strauch, Nolan & Neale
ATTORNEYS

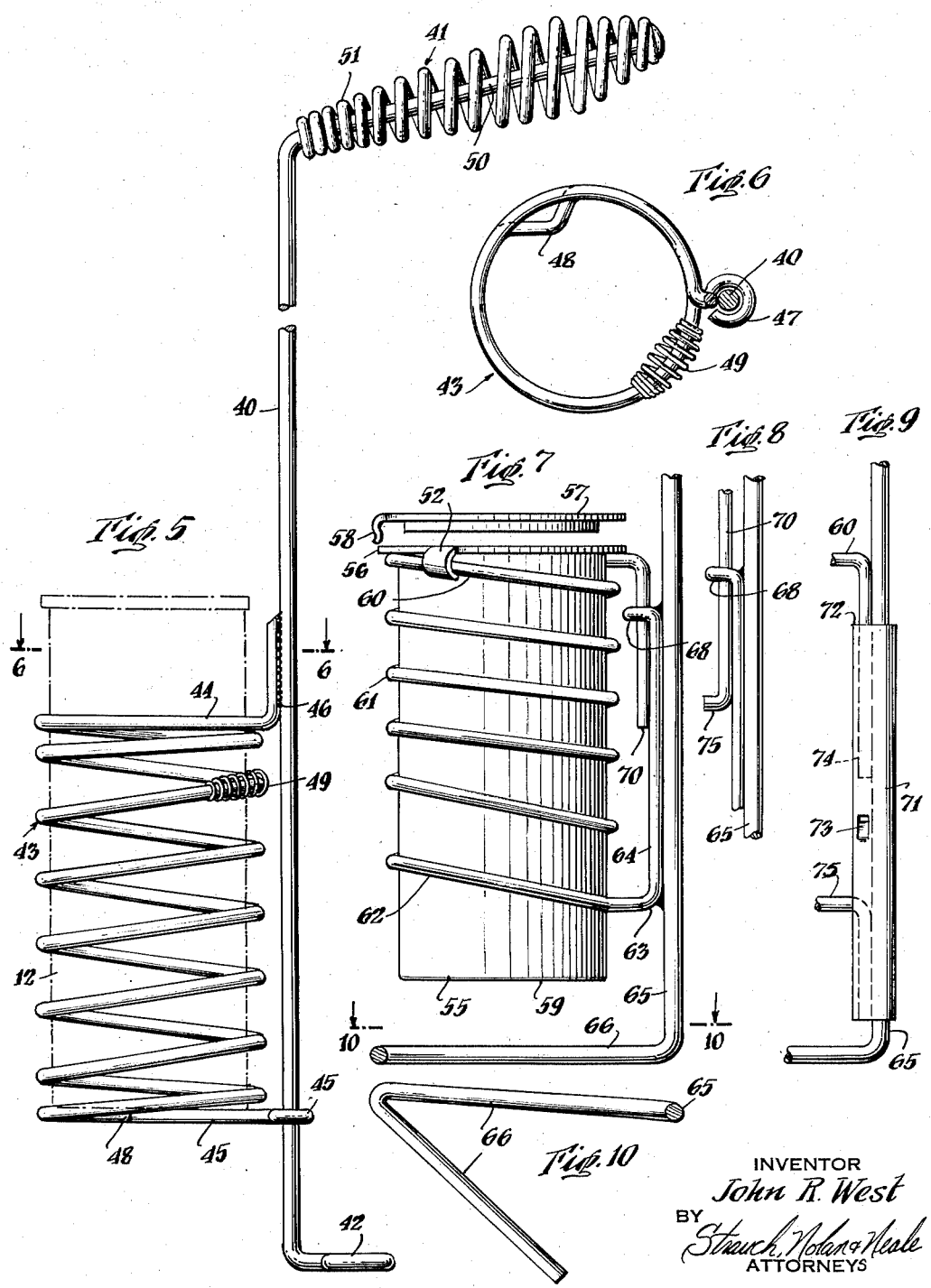

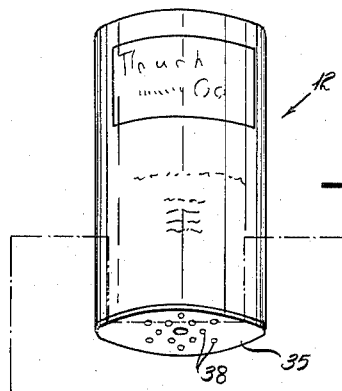
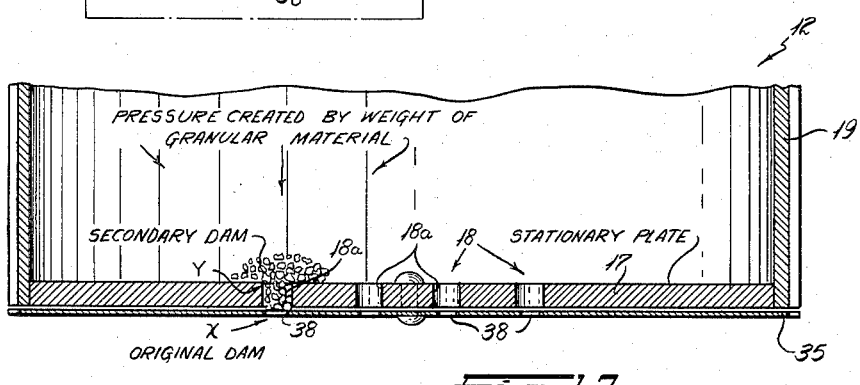
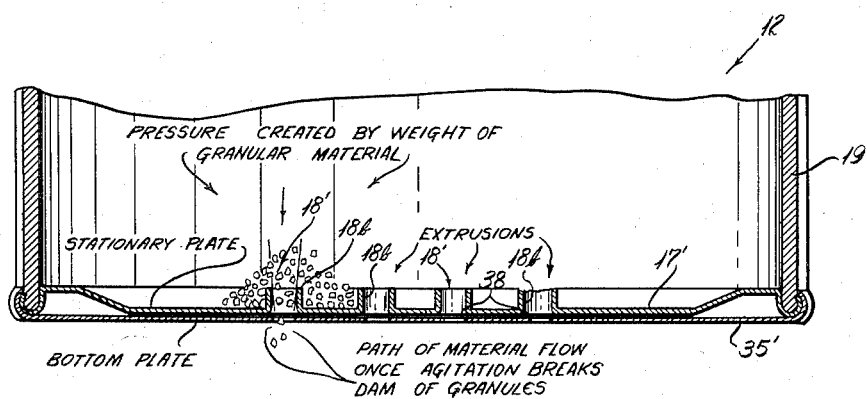

United States Patent Office 2,889,082
Patented June 2, 1959

2,889,082

GRANULAR MATERIAL DISPENSING APPARATUS

John R. West, Marysville, Ohio, assignor to O. M. Scott and Sons Company, Marysville, Ohio, a corporation of Ohio Application May 8, 1956, Serial No. 583,556

22 Claims. (Cl. 222—161)

This invention relates to granular material dispensing apparatus. In its preferred embodiments the invention relates to hand applicators for dispensing granular fertilizers, insecticides and herbicides and applying them to soil and/or plants growing in the soil, as for example in the care of lawns, gardens and cultivated areas. This application is a continuation-in-part of my copending application Serial No. 482,861 filed on January 19, 1955, now abandoned.

In the care of lawns and gardens there is a large demand for a satisfactory and dependable, readily portable, hand carried implement for dispensing and applying various granular materials such as fertilizers, insecticides and herbicides, hereinafter referred to as materials, on selected portions of the soil or plants in the soil. The applicator must be lightweight, inexpensive to produce, carry sufficient material to accomplish effective application of and be easily refilled with new material. It must be capable of applying a generally predetermined quantity of material at each application to avoid waste and detrimental effects from over dispensing. It must be capable of closely directed application to the desired spot or localized area, at the same time avoiding direct contact of applicator structure with the plant structure receiving the material, to avoid plant disturbances that would shake the applied material from the plant. It must be capable of being easily hand carried between points of application without loss of material and the operator should be able to use the applicator without bending or stooping.

The prior art attempts to satisfy this demand have failed in many of the foregoing desired requisites. Many applicators are complex in structure and do not confine application to spot areas. Refilling the material container of prior devices is often a wasteful messy operation. Other applicators are merely hand shaker boxes. Probably the most disadvantageous feature of prior art hand applicators is the inability to accurately dispense a predetermined quantity of material at each application. Some require continuous shaking to dispense any appreciable quantity of material, which of itself will tend to negate controlled application. Others dispense so freely through screens and apertures that they must be inverted, when not in use, to prevent loss of material and overapplication. One prior art applicator has a series of chambers and screens so arranged that the material passes from chamber to chamber and from screen to screen during application and is somewhat similar in actuation to old style flour sifters wherein an inner screen (or screens) is directly hand agitated. Such construction multiplies the necessary parts, time required for assembly, and cost of production. Furthermore, multiple parts increase the likelihood of failure to function.

Patents Nos. 468,685 and 1,525,900 cited in copending application Serial No. 482,861, are exemplary of previous unsuccessful efforts and failures to produce satisfactory hand applicators.

My applicator, as it was disclosed and described in the above application Serial No. 482,861, satisfies all of the aforelisted prerequisites besides having additional versatility in other respects. This applicator (Fig. 1), is an elongate assembly of a support shaft, a handle, a foot, a resilient container support closely adjacent but spaced from the foot, and a container or canister of granulated material, firmly held in the resilient support, the bottom of the container constituting a selectively adjustable dispensing structure. Operation of this applicator can be compared to using a walking cane. It is operable from a standing position by tapping, bouncing or hitting the foot on the ground adjacent the plant or lawn area where application of the material is desired. This action creates a jar throughout the assembly causing vibratory action of the container, because of its resilient support, resulting in ejection of a predetermined quantity of the granulated material from the container. The material container can be made with a removable lid for refilling or alternatively, it can be made as a disposable prepackaged container to be inserted in the resilient support as desired.

The dispensing structure on the bottom end of the container preferably consists of two relatively shiftable apertured plates somewhat similar to the apertured top of baby powder cans. However, the structural relationship of the apertures in each plate to one another and to the grain size of the granulated material is of specific importance in controlled dispensing as will be more fully described hereinafter. For this reason, the use of disposable containers of granulated materials properly correlated with the container dispensing apertures enables correct packaging and use of many types and grain sizes of materials without the risk of improper dispensing. The aperture formation and desirable relationship with the screen grade of material granules will be described hereinafter. One important aspect that provides controlled metering of discharged particles is the provision of metering chambers or pockets immediately above each outlet perforation. As will be explained this chamber or pocket permits a substantially predetermined amount of properly sized granulated material to be dispensed, for each agitation of the canister, before the flow is automatically terminated by the related material and aperture formations.

An additional feature of my improved applicator is in the special resilient handle construction that permits the unit to be held off the ground and causes agitating vibratory movement to be readily transmitted from the operator's hand through the handle to the container merely by shaking the hand in short movements. This method of using the applicator will disperse granular material over a broader area for special applications, for example, in applying herbicides to crab grass.

In addition to the disclosure of the aforementioned application, this continuation-in-part application discloses several additional embodiments of my applicator which, although constructed in a different manner from my original applicator, use precisely the same principles and basic elements in operation. Results of further research in determining various predetermined relationships between the container discharge aperture size and ranges of grain sizes formed in the grandulated mixtures in the container have been used herein in order to enable the presentation of a more complete explanation of the novel satisfactory dispensing action realized by my invention.

Accordingly, a primary object of this invention resides in the provision of novel apparatus for dispensing and applying granulated materials, such as fertilizer, insecticides and herbicides, to lawn, garden and cultivated areas.

Another object resides in the provision of a novel hand applicator having a shaft, a handle on the shaft, a foot adjacent one end of the shaft, a resilient support adjacent the foot end of the shaft and a granular material dispensing container firmly carried by the resilient support, and which may be further modified by providing resiliency between the handle and the shaft.

A further object resides in the provision of a novel applicator component having a shaft, a handle on the shaft, a foot adjacent one end of the shaft and a resilient support adjacent the foot end of the shaft adapted to receive and firmly hold a granulated material dispensing container, and this structure can be further modified by providing resiliency between the handle and the shaft.

Still another object resides in providing a container having specifically formed dispensing apertures with granulated material in the container, the range of grain size of the granulated material having a predetermined novel correlation with the discharge size of said apertures whereby dispensing of granulated material is prevented except during a jarring or vibratory agitation of the container. Furthermore by specific novel formation of the inner portion of the apertures the discharge quantity of granulated material can be effectively controlled. The inner and outer portions of each aperture may be incorporated in separate plates, selectively adjustably arranged so the discharge passages through the apertures can be closed.

A still further object resides in providing a novel applicator component including shaft, handle, foot and resilient container support wherein the resilient support consists of a coiled rod having one end fastened to the shaft and the other end movable at least vertically relative to the shaft, with structure to firmly retain a dispensing container within the coiled rod so the resiliency of the coiled rod between its fixed and movable ends will impart agitation induced vibratory movement to and through the container to the granulated material upon jarring of the foot against the ground.

Further novel features and objects of this invention will become apparent from the following detailed descriptions and the appended claims in conjunction with the accompanying drawings showing preferred embodiments thereof, in which:

Figure 1 is a sectional side elevation view of the preferred embodiment of the applicator of this invention;

Figure 2 is a rear view of the applicator embodiment of Figure 1, showing the canister and resilient support;

Figure 3 is a sectional view of the canister taken on line 3—3 of Figure 1, illustrating an arrangement of the dispensing apertures in the bottom of the canister;

Figure 4 is a modified version of the embodiment shown in Figure 1, the lower portion of the coiled holder having a different support formation for engaging the bottom of the canister;

Figure 5 is a side view of another embodiment, the canister holder being separately formed and secured to the applicator shaft;

Figure 6 is a sectional view taken on line 6—6 of Figure 5, illustrating details of the resilient holder;

Figure 7 is a fragmentary side view illustrating another embodiment of the invention;

Figure 8 is a fragmentary view illustrating a detail mounting of the resilient support used with the Figure 7 embodiment to prevent undesired displacement of the slidable support end;

Figure 9 is a fragmentary view illustrating a further manner of mounting the holding coil of Figure 7 on the applicator shaft;

Figure 10 is a detail plan view illustrating the foot of the Figure 7 embodiment;

Figure 11 is a perspective view of a canister for the applicator;

Figure 12 is an enlarged sectional view taken on the plane denoted by phantom lines in Figure 11, illustrating a dammed condition of the dispensing apertures in the bottom of the canister; and Figure 13 is a view similar to Figure 11 with the dispensing apertures constructed in a different manner from that shown in Figure 11, and illustrating the granular material being dispensed when the dams are broken by agitation.

With reference to the drawings, the applicator shown in Figure 1 has a canister holder formed from a cylindrical rod of spring steel, a portion of which is shaped as a shaft 10 approximately two feet in length. One end of the shaft 10 is formed with helical turns or coils 11 for holding the canister 12 and the other end is formed as a handle 13 for hand carrying and operating shaft 10 and canister 12 in a generally vertical position. The handle includes rod portion 14 bent at an angle greater than ninety degrees to the shaft 10. A resilient grip 15 is securely fastened to rod portion 14 and is made from a spring steel wire formed in helical turns to provide resiliency between the shaft 10 and an operator's hand grasping the grip.

The end of the rod portion 14 forms a loop 16, retaining the grip 15 and also providing means for hanging the applicator when not in use.

Canister 12 has a fixed bottom plate 17 with apertures 18 for passing granular material and a cylindrically shaped wall 19 forming a storage space 20. The top of the canister is open and can be closed by a lid 21 to retain the contents in the can on use of the applicator and which may be readily removed for filling the storage space 20. Fastened to or adjacent the bottom 17 is an adjustable control plate or disc 35 with aperture openings 38 that can be selectively aligned with apertures 18. The size of the passages through the aligned apertures 18 and 38 have a predetermined interrelationship so the passages only pass the granular material on an agitation of the canister, the granular material automatically blocking the passages when the canister is not shaken. Canister 12 fits within the helical coils 11 which are formed so the inner diameter of the coil is slightly greater than the outer diameter of the canister 12. Coils 11 comprise a tight upper turn 22 for circumferentially embracing a midportion of the canister and spaced turns 23, 24 for encircling and holding the canister 12 below the midportion. Adjacent the bottom of the canister the coils 11 are continued into a reduced diameter turn or a portion of a turn 25 that is disposed normal to the axis of the helical coils 11 and has a diameter equal to or slightly less than the diameter of canister 12 so the canister rests or is supported thereby. The bottom edge of the canister has a bead 26 which rests on the turn 25. In the modification shown in Fig. 4, an indentation 25a is provided in turn 24 and bead 26 of the canister rests on the indentation to provide vertical support for the canister.

A vertical spring band 27 (Figures 1–4) is positioned between the canister 12 and the coils 11 and normally assumes a curved or bowed shape. The lower end of band 27 has a hook 28 snapped on the turn 25 and its upper end has an apertured slide portion 29 formed around the shaft 10. As the band 27 is compressed, it remains laterally in position inside the coils. As the canister 12 is forced into its position with coils 11, the spring band 27 is straightened from its bowed shape and the portion 29 will move from the dotted position to the full line position shown in Fig. 1. Band 27 has an inner flat surface that presses against the side wall of canister 12 to snugly hold the canister against the inner surfaces of the portions of the helical coils 11 opposite to the band 27 and will prevent motion or vibration between the canister 12 and the holding coils 11. The band should be of a stiff spring metal that does not flex under the jarring operating forces, and will frictionally hold the canister from longitudinal movement out of the helical turns 11. This longitudinal movement is prevented in cooperation with the helical turns.

Canister 11 may be conveniently removed from the helical turns for refilling or a disposable canister may be provided with properly shaped apertures for dispensing granular material from the canister. The walls of the canister are preferably made of rigid material that can withstand the pressure applied by the band 27. The material may be stiff, pressed board, stiff metal or other suitable material. Although a cylindrical canister 12 and cylindrical holding coils 11 are illustrated, it is to be understood that square or other cross-sectional shaped canisters can be used with coils 11 appropriately formed with square or other style turns.

The canister is spaced from the surface 30, upon which the granular material is to be spread, by a helical spring 31 continuation of coil 11 with an integral foot 32 on or connected to its lower end. The foot 32 is formed in a loop normal to the axis of the helical turns and constitutes what can be termed a surface abutment adapted to engage a substantially flat surface 30, such as a lawn or cultivated area. The helical spring 31 is preferably made of two complete turns of the spring steel rod having a 7/32" diameter and having an action which causes agitation of the material within the canister when it is dropped or bounced lightly on the surface 30 so the granular material will flow through the dispensing passages in the bottom of the canister. Shaft 10, the canister 12 and coils 11 form a unitary structure that moves together and applies its weight in unison to the spring 31. The canister, being firmly held in the turns 11, does not absorb any of the jarring action but vibrationally transmits it to the granular material stored therein and thus agitates the material and dispenses a substantially uniform amount through the perforations 18 and 38. Also, there is a single application of material for each jarring operation, as will be described.

The method of application can be accomplished by holding the applicator above the ground, to be hand operated by shaking to provide a fairly continuous flow of granular material through the dispensing passages. Since the grip 15 is made of a spring wire, a shaking of the applicator by hand causes the grip to impart a continuous rhythmic vibration to the canister 12. This method of using the applicator is advantageous in treating a large area. The first described method of dropping, bouncing or tapping the foot on a surface is most advantageous in applying granular material to a specific spot, e.g., using spot applications of a herbicide to kill individual weeds or the like.

Figures 1, 3, 11, and particularly 12 and 13 illustrate details of the plurality of dispensing passages through the bottom of the canister 12. A substantially predetermined metered control of the amount of material applied at one jarring or agitation of the canister 12 is obtained by the depth of the side walls 18a of the apertures 18 in bottom plate 17, and flow control is provided by a predetermined relationship between the material grain size and the diameters of bottom plate apertures 18 and control plate openings 38.

Referring to Figures 12 and 13 it will be seen that the amount of material passing through each dispensing passage will to a large extent be controlled by the pocket or tube-like formation provided by the depth of the aperture wall 18. Pressure or weight of the granules pressing against each other sidewise as well as in a downward direction results in several grains forming an arched dam X over the opening 38 as indicated in Figure 12. The side pressure is partially relieved in the pocket formed by aperture 18. Hence upon agitation of the canister with its contained material the arched dam X will be destroyed as illustrated in Figure 13 and the material in the pocket will flow through the opening 38 in the control plate 35. A slight amount of the other material above the tunnel will flow through and out before a new dam X forms across the control plate opening 38. Pressure of the upper material starting to flow into and through the passage forms a funnel shaped discharging mass and creates the sidewise and vertical pressure necessary to create the new arched particle dam X against the edge and across control plate openings 38.

A secondary arched dam Y of several granules forms at the entrance to the aperture 18 in bottom plate 17. Dam Y will also break upon agitation and the break occurs immediately after the lower dam X breaks because material in the pocket helps maintain the secondary dam Y. This slight delay in breaking of the secondary dam Y after dam X breaks, relieves pressure on the grain particles in the pocket and they will pass out without causing a new dam X against the edges and over the control plate openings 38. It is clearly illustrated in Figure 13 that breaking of the secondary dam Y permits additional material to enter the pocket with a funneling effect due to pressures from all sides created by weight of the material. The funneling nature of the grain particles permits a new dam X to be immediately formed by the edge of the control plate opening 38 projected slightly past the edges of associated aperture 18.

Figures 12 and 13 illustrate two modes of construction of the apertured bottom 17 and control plate 35, both of which are capable of solving the problem of discharging a specific quantity of granular material during and after each jar or agitation of the canister. For purpose of disclosure, the depth of the stationary plate 17 in Figure 12 is the same thickness as is the length of the aperture wall 18b (Figure 13), which are formed in a thin metal plate by a punch and die operation. In each construction the thin control plate 35 or 35' is rotatable so its openings 38 can be moved out of alignment with the apertures 18 or 18' thereby providing means for closing the apertures when the unit is not in use. The aforedescribed principal of metered dispensing of granulated material is identical in each type of construction illustrated. It is possible but not economically practical to produce a single thick bottom plate on the canister provided with special counter-punched apertures having a pocket shaped inlet portion and a smaller diameter outlet portion that will enable the same type of metered dispensing.

Limitation of the amount of material applied at any one agitation cannot be properly controlled by merely varying the size of the outlet passage or even of control plate opening 38 because if the hole is enlarged to permit a greater flow of material without varying the screen grade of the granular particles being dispensed, the flow may be practically continuous because a critical point is passed where it is impossible for the granules to arch and form a dam across the control plate openings.

To obtain a greater or less quantity of material discharged at any one agitation, the metered amount can be controlled within reasonable limits by increasing or decreasing the depth of the canister bottom plate 17 (Figure 12) or the depth of the die formed wall 18b forming the aperture 18' in sheet metal plate 17' (Figure 13). Through proper use of punch and dies, the depth of walls 18b can be varied within limits by creating what is an extruding operation. For example, by reducing the thickness of wall 18b by extrusion during punching, a greater depth can be obtained. The combined punching and extruding of walls 18b results in an irregular jagged entrance portion as shown by the wall 18b at the right hand aperture in Figure 13, which for purposes of economy in production are permitted to remain. The jagged edged wall will provide the proper depth pocket and enables the secondary dam Y to form at the entrance of the pocket. To provide a sufficient amount of granular material between the secondary dams Y and lower dams X, to enable an effective metered discharge, the pocket depth should preferably be not less than a value approximately equal to 60% of the diameter of the control plate perforations and a maximum depth of approximately 100% of the same diameter. Thus the combination of a pocket aperture and a control plate opening of a lesser width than the aperture provides a valve action permitting a given quantity of granular material to be discharged before the blocking of the opening by the granular material. It is herein noted that the pockets are not necessary for dispensing by agitation, but they do provide a means for predetermined metered dispensing.

The perforations 18 and 38 in the bottom of the canister 12 are preferably adjustable in relation to one another so the canister may be adapted to a range of different sized granular materials. This may be done in a number of different ways, one of which is shown in Fig. 3 where the rotating control plate 35 is secured to the bottom of the canister by a rivet or bolt 36, passing through the canister bottom 17 and the plate 35, with a spring washer 37 fitted on the outer end of the rivet 36 and held in compressed engagement with the adjustable plate 35 by the rivet head. The spring washer presses the plate 35 against the canister bottom 17 so control plate 35 will remain in position after adjustment and will not shift upon jarring of the canister. A knob 40 can be provided at the center of the control plate for setting the position of the disc. The rotating plate need only be moved to a very slight angle to obtain the full open adjustment. The apertures 38 therefore determine the maximum size of the discharge passage. The small control plate openings 38 may be moved from a fully overlapping position A (Fig. 3) to a blocked position B shown in dotted lines in Fig. 3. The openings 38 have a position which completely closes the bottom of the canister by having the openings 38 correspond with the web portion 39 between the apertures 18 in the canister bottom. Openings 38 may, if desired, be set at intermediate overlapping positions to adjust the passage for different size granular material. The edge of the apertures 18 will thus cut across the smaller openings 38 and a portion of the edge of one opening 38 and a portion of the edge of the aperture 18 form the passage through which the material passes. All the openings 38 have the same relative position with the corresponding apertures 18 so that all passages are opened and closed at the same time.

As a result of tests, an approximate relationship between the average size of granules in a specific granulated mixture and the sizes of the canister bottom apertures 18 and control plate perforations 38 has been determined. Several results of the tests are set forth below. Materials utilized during the tests were granulated materials presently used as fertilizers and herbicides. For optimum results, each control plate perforation 38 should preferably be of sufficient diameter to simultaneously pass from about three to five of the average sized granules of the desired mixture. The size of apertures 18 in the canister bottom should be that diameter of opening at which free flow of the average sized granules occurs. Without a control plate the apertures 18 must be large enough to prevent the granules from forming an arched dam. From the test results it was determined that the granulated material becomes free flowing through an opening approximately six times the average granule size. Thus, the relationship between the diameter of a control plate perforation 38 and the diameter of a canister bottom aperture 18 is determined to be approximately 70%. The average granule size being equal to $a$, the diameter of the apertures 18 should be approximately $6a$ and the diameter of control plate perforations should be approximately $.7 \times 6a = 4.2a$.

One commercial material tested, and presently being marketed, has granules which screen at an average United States Standard Sieve Number between 20 and 40, containing some particles as large as Sieve Number 16 and some as small as Sieve Number 100. This material can be dispensed in a highly satisfactory predeterminable manner if the diameter of control plate perforations is $5/64$ inch (.078) and the diameter of canister bottom apertures is $7/64$ inch (.109 inch). The diameter of control plate perforation is 71% of the diameter of the canister bottom aperture. Sieve Number 20 has openings approximately .033 inch and Sieve Number 40 has openings approximately .0165 inch, the average grain size of such granulated material being somewhere between $3/7$ and $1/6$ of perforation diameter, approximately one-third of the perforation diameter.

A second grade of material tested consisted of larger granules. The granules of the grade utilized would all pass a Number 6 United States Standard Sieve and none would pass a Number 10 Sieve. Various size apertures in the canister bottom were tested to determine where the material became free flowing. This value was $20/32$ inch (.625 inch). Various control plate perforations were tested to determine the size necessary to discharge during an agitation for a period equivalent to that occurring with the commercial material above. This value was $14/32$ inch (.437 inch). Sieve Number 6 has openings approximately .1323 inch and Sieve Number 10 has openings approximately .0787 inch. Thus from 3 to 5 granules would simultaneously pass through the control plate perforation of .437 inch diameter. The diameter of a control plate perforation is 70% of the diameter of a canister bottom aperture.

The above relationship was determined for a specific type of granular material and the same values will not necessarily result in satisfactory operation with other materials, for example, fertilizer pellets. However a relationship of grain size to dispensing openings can be determined for other types of granules, and metered dispensing according to this invention can be realized.

Applicator modification

Referring to Figure 5, another embodiment of the applicator is constructed with a cylindrical rod 40 having a handle 41 at one end and a foot 42 at the other end for use in tapping or bouncing the applicator on the ground. A resilient canister support 43 is secured on the rod 40 for holding the canister 12 (indicated by dotted lines) containing granular material. The resilient support 43 comprises a helical spring coil preferably having four or more turns rigidly secured to the rod 40 only at the upper end and slideably connected to rod 40 at its lower end. The upper turn 44 and the lower turn 45 are tightly formed to stiffen the ends of the resilient support. Upper turn 44 has an L-shaped end member 46 extending vertically which is rigidly secured to the rod 40 in a suitable manner as by welding. The end of lower turn 45 has a sliding guide member 47 maintaining the support adjacent the rod 40 and permitting longitudinal movement and flexure of the spring. The support is mounted on the lower portion of rod 40 and is spaced from the foot end to hold the canister above the lawn or other area on engagement of the foot 42 and to thereby permit longitudinal vibration of the spring coils.

The turns of the helical spring have an inner diameter slightly larger than the outer diameter of the canister and the bottom turn 45 has a supporting function enabled by the V-shaped indentation 48. Canister 12 fits snugly in the coils of support 43 and the weight of the canister is sufficient to retain it in the spring during the dispensing vibration. However, a coiled, tapered retaining spring 49 may be provided on one of the upper turns to resiliently press against the canister and maintain it firmly in place. The retaining spring 49 is preferably made with helical turns of hard drawn steel, the spring being tapered from the center to each end. The end coils of the spring 49 grip the turn of the coiled support 43 to hold the retaining spring 49 in position. On insertion of the canister, the spring is flexed against the turn and the canister is held firmly in position. The sliding guide member 47 on the lower end of coiled support 43 may be an eye member encircling the rod 40 and having a large tolerance to permit free sliding along the rod.

Handle 41 consists of a lateral portion 50 of the rod 40 and a helical steel spring tapered from the end of the member 50 to the rod 40. One end of spring 51 may be welded or otherwise secured to the end of the member 50 and the other end is abutted against the bend between rod portion 50 and the vertical portion of rod 40. Spring grip 51, as in the modification of Figures 1–4, aids in creating the vibratory motion necessary to shake the granular material through the discharge passages in the canister 12 when the applicator is held and hand vibrated clear of the ground. The spring grip 51 causes a higher frequency of vibration thereby assisting greatly in maintaining the discharge passage in an undammed condition. The foot 42 comprises a large eye member extending normal to the end of the rod 40 on the side of the rod opposite the canister support 43. The area of the ground below the canister is thus unobstructed and not disturbed when the applicator is tapped, dropped or bounced on the ground.

As previously described in connection with the other embodiments, the applicator is utilized by filling the canister 12 with granular material and the bottom of the canister is then held over the area to be treated. The foot 42 is then jarred against the ground causing the spring support 43 to vibrate and thus agitate and discharge the granular material through the discharge passages in the canister bottom. If a wider area is to be treated, the applicator is held with the foot 42 clear of the ground and is reciprocated vertically so the weight of the can causes the spring support 43 to oscillate, shaking the granular material through the openings. In this latter method of applying the granular material, the spiral grip 51 assists in causing the spring to vibrate at a higher rate.

In Figures 7 through 9 another embodiment of the invention is shown in which the canister is supported at its upper edge. The canister 55 of Fig. 7 is generally similar to canister 12 of the original case except that it has a flange 56 at the top and a flanged cover 57 which should be snugly fitted in place or provided with spring lip means 58 engaging the flange 56 to hold the cover 57 tight during vibration. The bottom of the canister 59 is provided with discharge apertures and control plate orifices similar to these previously described.

The canister 55 is supported by top coil 60 of a helical support spring 61 and the top loop 60 fits tight around the canister to hold it firmly in place. The canister flange 56 is secured to the top coil by the spring and may have circumferentially spaced spring clips 52 securing the can to the loop. The remaining coils of the spring 61 loosely fit around the canister and the lower end 62 of the spring is carried out and bent upward at 63 to form a vertically extending portion 64 which is fastened to the rod shank 65 of the applicator structure. A triangular or other suitably shaped foot portion 66 (Fig. 10) and a handle (not shown) corresponding, for instance, to the spring handles of the embodiments in Figs. 1 and 5, are provided at the ends of the rod 65.

The vertically extended portion 64 of support spring 61 terminates as a loop 68 through which slides the downwardly bent end 70 of the upper end of the helical support spring 61. Vertical portion 64 may be fastened to the shank 65 by pressing, welding, brazing, soldering, or other means, for instance by a sheet metal sleeve 71 such as illustrated in Figure 9.

With the canister 55 fastened in place against the top coil of the helical support spring 61, the vibrations may be imparted to canister and contents as previously described in connection with the other embodiments. The support spring 61 will intervene between the rod and the canister when the applicator foot is jarred against the ground surface permitting downward movement of the canister to compress the spring and sliding the end 70 in the loop 68. This action will loosen rather than tighten the lower convolutions so that there will be no resistance to the vibration of the canister by spring expansions and contractions responsive to jarring of the applicator against the ground.

Similarly the vibrations of the spring supported canister held above the ground will be responsive to the up and down movements of the applicator as a whole. With a spring type handle, such as shown in Figures 1 and 5, further resilience will be imposed upon the canister support with corresponding accentuation of the vibration.

In the embodiment of Figure 7, the loop 68 will limit the downward movement as predetermined by the distance between loop 68 and the top coil 60 of the support spring 61. In Figure 8 the bent tip 75 of the spring end 70 will provide an upper limit of movement of the canister when the tip 75 engages loop 69. These sudden stops may be helpful in the agitation of the the material in the canister.

The modification shown in Figure 9 has the lower end 75 of the helical support spring bent downward and fastened to the rod shank 65 by a sheet metal sleeve 71. The downwardly bent upper end of the top support spring coil 60 is slideably carried within upper portion of the sleeve 71. Downward movement of the canister will be limited by the engagement of the upper support spring coil 60 with the top end 72 of the sleeve 71, or it may be limited by abutment of lower end 74 against a pressed-in portion 73 of the sleeve.

From the foregoing it is evident that I have invented a new lightweight, rugged, granular material hand applicator of simple construction and capable of various constructions. The applicator support structure incorporates a handle, a shaft, a foot and a resilient canister support. Granulated material is stored in a dispensing canister with discharge passages formed in a predetermined shape and size relationship with the screen grade size of the particles of granulated material to be dispensed to provide a metered discharge of material upon agitation by resilient support vibration. The support vibration can be accomplished in several ways, one of which is dropping, tapping or bouncing the applicator foot on the area requiring material treatment and another being to reciprocably move the entire apparatus by hand above an area to be treated. The latter hand movement is aided by a resiliently fastened handle grip. Each way of using this apparatus includes the changing direction of movement of the apparatus which change is converted through the support spring to a resilient vibratory movement of the canister causing an agitation of the granulated material sufficient to destroy the grain particle dams that block the dispensing passages. This permits a discharge of granulated material until the agitation ceases and new grain particle dams automatically form and block the passages.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United Statets Letters Patent is:

1. An applicator, for dispensing granular material onto a surface, comprising: a canister having a bottom wall and a side wall extending around the edge of the bottom wall to form a storage space for granular material, perforations through the bottom wall enabling discharge of said material freely onto said surface and passing the granular material from said storage space through said perforations only on agitation of the canister as a whole; means supporting said canister in a substantially vertical position with said material therein including resilient means having a member for engaging a surface underneath and yieldingly spacing said canister above said surface a predetermined distance to produce an agitation of the canister as a whole by vertical movement of said canister under compression and release of said resilient means to thereby cause the granular material to pass through the perforations of the canister.

2. A granular material applicator as defined in claim 1 wherein, said means supporting said canister comprises: a shaft, a handle at one end of the shaft and helical holding turns at the other end for surrounding and holding a canister and having a lower turn for supporting said canister, a spring connected to said helical turns, a turn at the end of the spring in the same plane for engaging a relatively flat surface, said canister being positioned in said holding turns and resting on said supporting turn.

3. A granular material applicator comprising: a shaft, a handle at one end of the shaft and helical holding turns at the other end for surrounding and holding a canister and having a lower turn for supporting said canister under its bottom, a canister removably positioned in said holding turns and resting on said lower turn and having a bottom with perforations to pass granular material from said canister on shaking of the applicator, and resilient means frictionally retaining said canister in position in said holding turns with the top of the canister readily accessible for replenishment of the supply of granular material.

4. A granular material applicator adaptable to various sizes of granules and comprising: a canister containing the granular material; a holder formed by a shaft, a handle, and coiled means at the lower end of the shaft surrounding and removably retaining said canister in vertical position; a pair of relatively adjustable upper and lower parallel disks forming the bottom of said canister and having perforations adapted to be in register in predetermined adjusted position of said disks and in various amounts of overlap in other selective adjusted positions of said disks so as to vary the sizes of the resultant discharge openings through said perforations at different relative adjustments of said disks, the diameter of perforations in the lower disk being substantially about 70% of the diameter of perforations in the upper disk and being spaced to be closed by the web portions between the perforations of the upper disk in a predetermined relative adjustment of said disks.

5. A granular material hand applicator comprising: a shaft, a handle on the shaft, a surface abutment means fastened adjacent one end of the shaft, a resilient support fastened adjacent the abutment end of said shaft, a granular material dispensing container and means on said resilient support firmly carrying said container in resilient relation to said shaft whereby jarring of said applicator by impacting said surface abutment means against a surface will agitate the container relative to said shaft.

6. An applicator as defined in claim 5, wherein means fasten said handle to said shaft and provide limited resilient movement between said handle and said shaft.

7. An applicator for dispensing granular material onto a surface comprising: a canister having a bottom wall and side wall structure extending around the edge of the bottom wall to form a storage space for granular material, said bottom wall having perforations therethrough for passing the granular material from said storage space through said perforations to discharge said material freely onto said surface only on agitation of the canister as a whole; a shaft; resilient means for holding said canister in a substantially vertical position, with said material therein; means securing one portion of said resilient means to the shaft, the remaining portion remaining resiliently free to move relative to said secured portion; means adjacent said remaining portion for firmly supporting said canister in a resilient relation with said secured portion to produce a vibratory agitation of the canister and granular material by vertical movement of said canister under compression and release of said resilient means to thereby cause the granular material to pass through the perforations of the canister.

8. An applicator for dispensing granular material on a surface from a perforated canister supported by the applicator, comprising: a shaft, resilient means for holding the canister in a substantially vertical position, one portion of said resilient means being secured to said shaft and means on another portion of said resilient means, spaced apart from said one portion, slideably securing said resilient means to said shaft so said resilient means will agitate the canister as a whole upon jarring by compression and release of said resilient means to cause the granular material to pass through the perforations of the canister.

9. A granular material applicator as set forth in claim 8 wherein said fixedly secured one portion of said resilient holding means is mounted on said shaft between said handle and said slideably securing means, and said holding means has supporting means adjacent said slideable portion for firmly retaining said canister in said holding means.

10. A granular material applicator as set forth in claim 8 wherein said slideably securing means is mounted on said shaft between said handle and said fixedly secured one portion and said holding means has supporting means at said slideable other portion for firmly supporting said canister in said holding means.

11. A granular material applicator as set forth in claim 8 wherein means are provided to limit the movement of said slideable other portion of said resilient holding means thereby causing a jarring action to be imparted to said canister to shake material through the perforations in the canister.

12. An applicator for dispensing granular material on a surface comprising: a canister having a bottom wall and side wall structure extending around the edge of the bottom wall to form a storage space for granular material; said bottom wall having apertures therethrough enabling discharging of said material freely onto said surface from said storage space only on agitation of the canister as a whole; a shaft; a handle at one end of the shaft with a resilient grip; and resilient means for holding said canister extending longitudinally adjacent a lower portion of said shaft; a member at the upper end of said resilient means fixedly securing said resilient means to said shaft and having means firmly positioning said canister relative to said resilient means and said shaft so that said holding means and canister will vibrate on actuation of said shaft by means of said grip, for producing a agitation of the canister as a whole by compression and release of said resilient means and causing the granular material to pass through the apertures of the canister.

13. An applicator component comprising: a shaft; a handle on shaft; a surface abutment means fastened adjacent one end of the shaft; and a resilient support fastened adjacent the abutment end of said shaft and including means adapted to receive and firmly hold a granulated material dispensing container in resilient relationship to said shaft.

14. An applicator component as defined in claim 13, wherein means fasten said handle to said shaft and provide resilient movement between said handle and said shaft.

15. An applicator component comprising: a shaft; a handle; a foot; and a resilient container support; said resilient support consisting of a coiled rod having one end fastened to said shaft and the other end movable at least vertically relative to said shaft and structural means for firmly retaining a dispensing container within the coiled rod whereby the resiliency of the coiled rod between its fixed and movable ends will impart an agitative movement to the container upon jarring of said foot against an object.

16. A container; granulated material having grains with sizes between predetermined U.S. Standard sieve grade limits in said container, the upper limit of sieve grade size being of a size to prevent simultaneous passage of approximately four grains of the average size in said granulated material; said container having dispensing passages in its bottom, the outlet cross-section area of each passage having a value which will block simultaneous passage of several or more grains of the average size within said limits and will permit passage of at least one grain of the largest grain size in said granulated material; the portion of each of said passages open to the interior of said container being larger than said outlet cross-section area and also being of sufficiently large value to simultaneously pass considerably more than several grains of the average size between said limits and of sufficient depth to form a pocket above said aperture outlet.

17. In combination, granular material and a granular material dispensing container for use in combination with an applicator, said granular material having grain size within a predetermined range of sieve grades; said container comprising a bottom structure with material confining wall structure secured thereto; dispensing passages formed in said bottom structure with individual passages having an exterior portion and an interior portion, said exterior portion having a diameter approximately 70% of the diameter of said interior portion, the size of said exterior portion being insufficient to simultaneously pass more than several grains of the average grain grade in said range of grades, and the depth of said interior portion being sufficient to define a pocket for accumulating a plurality of grains of granular material above the exterior portion subject to vertical pressure but isolated from lateral pressure resulting from said granulated material in said container.

18. The container with granulated material therein as defined in claim 17, wherein said interior portions of said passages are provided in a plate member rigid with said material confining wall structure and exterior portions of said passages are provided in an outer plate disposed in parallel juxta-position to said plate member and adjustably secured relative thereto to provide means for moving said exterior portions of said passages out of alignment with said interior portions to thereby enable selective adjustment and closure of the passages.

19. A container with granulated material therein as defined in claim 18, wherein the thickness of said first plate is at least equal to one-half the maximum dimension across said exterior portion of an individual passage.

20. A container with granulated material therein as defined in claim 18, wherein said first plate consists of relatively thin material and said interior portion of said passages is provided by tubular integral portions of said sheet material disposed normal to said sheet material plate and providing through passage from one side of the sheet to the other, the axial dimension of said tubular portions being at least equal to one-half the greatest dimension across said exterior portion of an individual passage.

21. A container with granulated material therein as defined in claim 17, wherein the depth of said interior portion of said passages is at least as great as one-half the maximum dimension across said exterior portion of an individual passage.

22. Granulated material and a canister containing said material for dispensing said material onto a surface by agitation of said canister, said canister comprising a bottom having walled apertures of sufficient depth to receive and hold predetermined quantities of granulated material in vertical columnar formation, and a lower movable control plate selectively shiftable to close said apertures in one position and having perforations of less cross-sectional area registering with said apertures in another position to enable discharge of granular material from said orifices upon agitation of said canister, the area of said perforations being so related to the grain size of said granulated material that several grains at the bottom of each of said columnar formation in said apertures will coact with themselves and the edges of said control plate around said perforations to form dams to prevent dispensing of granulated material except during cycles of discharge agitation.

References Cited in the file of this patent

UNITED STATES PATENTS

| | | |
|---|---|---|
| 57,868 | Cleveland | Sept. 11, 1866 |
| 340,564 | Elliott | Apr. 27, 1886 |
| 591,216 | Griffin | Oct. 5, 1897 |
| 627,138 | Pottenger | June 20, 1899 |
| 1,476,655 | Strickland | Dec. 4, 1923 |
| 1,525,900 | Wyland | Feb. 10, 1925 |
| 1,631,540 | Clarke | June 14, 1927 |
| 2,014,789 | Suelflow et al. | Sept. 17, 1935 |
| 2,748,996 | Fritschi | June 5, 1956 |